United States Patent [19]
Yamaguchi

[11] 4,182,550
[45] Jan. 8, 1980

[54] MODIFIED GAUSS TYPE LENS SYSTEM

[75] Inventor: Tamikazu Yamaguchi, Sakai, Japan

[73] Assignee: Minolta Camera Kabushiki Kaisha, Osaka, Japan

[21] Appl. No.: 886,747

[22] Filed: Mar. 15, 1978

[30] Foreign Application Priority Data

Mar. 23, 1977 [JP] Japan ................... 52-32728

[51] Int. Cl.² ................................ G02B 9/62
[52] U.S. Cl. ................................ 350/215
[58] Field of Search ........................ 350/215

[56] References Cited

U.S. PATENT DOCUMENTS

| 3,552,829 | 1/1971 | Marquardt | 350/215 |
| 3,738,736 | 6/1973 | Shimizu | 350/215 |
| 4,094,588 | 6/1978 | Nakagawa | 350/215 |

*Primary Examiner*—Conrad J. Clark
*Attorney, Agent, or Firm*—Jackson, Jones & Price

[57] ABSTRACT

An improved Gauss type lens system having a relatively large aperture ratio is provided. The lens system comprises seven components between object and image as follows; a first positive meniscus lens element, a second positive meniscus lens element, a third negative meniscus lens element, a fourth meniscus shaped doublet, a fifth positive meniscus lens element, and a sixth positive lens element. The entire lens system is capable of providing a relative aperture of F No. 1.2, an angle of view of 50° and a back focus at least 0.7 times the overall focal length of the lens system.

4 Claims, 15 Drawing Figures

Spherical Aberration

Astigmatism

Distortion

Lateral Spherical Aberration

Spherical Aberration

Astigmatism

Distortion

Lateral Spherical Aberration

Spherical Aberration

Astigmatism

Distortion

Lateral Spherical Aberration

MODIFIED GAUSS TYPE LENS SYSTEM

BACKGROUND OF THE INVENTION

1. Field of the Invention

The present invention relates to an improved Gauss type lens system and more particularly to an improved Gauss type lens system having six groups which consists of seven elements to be used with a single lens reflex camera to provide a relatively fast, large aperture lens systems.

2. Description of the Prior Art

Gauss type lens systems or modifieid Gauss type lens systems have been generally used as a relatively large aperture ratio lens system, since field curvature can be favorably corrected with the Gauss lens design. A problem exists however relating to flare caused by off axial pencil rays since this aberration is difficult to be corrected when the aperture ratio is increased in the Gauss or modified Gauss type lens systems. Another problem relates to the back focal distance of the Gauss or modified Gauss type lens systems. Setting the back focal length in the lens system in the range of 50 to 60% is the normal design condition to maximize the solution of various aberrations. However, a back focal length of this magnitude is relatively unfavorable for a lens system that is to be used with a single lens reflex camera due to the requirement of providing sufficient back focal distance for the movable mirror located behind the system. In efforts to increase this back focal distance, the Gauss or modified Gauss type lens systems have been generally designed so that a relatively large refractive power is distributed in the lens groups at the image side of the aperture stop. This design option, however, is unfavorable in the correction of flare relating to the off axial pencil rays and also to the correction of field curvature.

As a result of these inherent problems in the Gauss design, it is extremely difficult to provide a large aperture ratio with sufficient back focal distance while at the same time correcting the various aberrations that exist. Generally the maximum back focal distance that the prior art has been able to achieve is 70% of the focal length of the system and to date there are no known lens systems of a Gauss or modified Gauss type wherein the back focal length reaches 80% of the focal length of the system. Generally with extremely high speed lens systems such as that of F No. 1.2, most of the Gauss or modified Gauss type lens systems have back focal distances less than 70% of the focal length of the system. An example of a relatively high speed modified Gauss type lens system with an angle of 46° can be seen in U.S. Pat. No. 3,738,736.

Various other examples of modified Gauss type lens systems of a six group, seven element design have been suggested such as those disclosed in U.S. Pat. No. 3,874,771; U.S. Pat. No. 3,451,745; U.S, Pat. No. 3,851,953; U.S. Pat. No. 3,984,155, U.S. Pat. No. 3,743,387; and U.S. Pat. No. 3,938,884. Additionally the German Patent Application Publications DAS Nos. 1277580, DOS 2607710, and DOS 2347262 are cited of interest. Finally, the Japanese Patent Publication No. 48-10083, Japanese Patent Publication No. 41-17176, Japanese Patent Publication No. 47-54013, Japanese Patent Publication No. 49-23891, Japanese Utility Model Publication No. 47-19025 and Japanese Application laid open to public inspection No. 51-148421 also disclose a six group seven lens element modified Gauss type lens systems.

The present invention provides a novel generic design of six group, seven lens element improved Gauss type lens system which is not disclosed by any of the lens system in the aforementioned prior art patent publication as can be readily perceived from the comparison between those lens systems and the conditions of the present inventive lens systems which are hereinafter defined.

SUMMARY OF THE INVENTION

An object of the present invention is to provide a six group, seven lens element improved Gauss type lens system with a relatively large back focal distance and large aperture ratio while still maintaining a proper balance in correction of various aberrations.

According to the present invention a back focal distance greater than 70% of the focal length of the lens system can be achieved with an extremely high speed lens system such as that of F No. 1.2. The present invention further permits a back focal distance of approximately 80% of the focal length of the entire lens system with an F No. of approximately 1.8. Both of these lens systems are designed to have a field angle of approximately 50° and with the proper correction of various aberrations taken into account. The design parameters which characterize the invention can be seen as follows;

$$-0.4 < (\Phi_4 + \Phi_5)f < -0.24 \tag{1}$$

$$-1.21 < (\Phi_1 + \Phi_3)/\Phi_6 < -1.12 \tag{2}$$

$$-1.21 < (\Phi_9 + \Phi_{11})/\Phi_7 < -1.13 \tag{3}$$

$$0.85 < (D_7 + D_8 + D_9 + D_{10})/(D_1 + D_2 + D_3 + D_4 + D_5) < 1.1 \tag{4}$$

$$N_3 < 1.67, N_4 < 1.67 \tag{5}$$

$$\nu_4 < \nu_3 \tag{6}$$

$$-0.1 < f/R8 < 0.2 \tag{7}$$

wherein $R_i$ represents the radius of curvature of the i-th refractive surface counted from the object side; $D_i$ represents the i-th axial distance (i.e., airspace or lens thickness) counted from the object side; $N_i$ represents the refractive index with respect to d-line of the i-th glass material counted from the object side; $\nu_i$ represents the Abbe number of the i-th glass material counted from the object side; $\Phi_i$ represents the refractive power of the i-th refractive surface counted from the object side. The refractive power $\Phi_i$ being defined by the radius of curvature $R_i$ of the i-th refractive surface, the refractive index n of the medium on the object side of the i-th refractive surface of the refractive index n' of the medium on the image side of the i-th refractive surface as follows:

$$\Phi_i = (n' - n)/R_i$$

Finally, f represents the focal length of the whole lens system.

The features of the present invention which are believed to be novel can be best understood, together with further objects and advantages, by reference to the following description, taken in connection with the accompanying drawings.

BRIEF DESCRIPTION OF THE PREFERRED EMBODIMENTS

The following description is provided to enable any person skilled in the optical arts to make and use the invention and sets forth the best modes contemplated by the inventor of carrying out his invention. Various modifications however, will remain readily apparent to those skilled in the art, since the generic principles of the present invention have been defined herein specifically to provide an improved Gauss type lens system that can be manufactured in a relatively economical manner.

The derivation of the formulae and the relation set forth herein have been accomplished with the assistance of a computer. The present invention represents the parameters of a compromised balance of acceptable aberrations in a relatively easily manufactured and low cost lens system for utilization, for example, with a single lens reflex camera.

Each of the individual lens elements are designated by the letter L and the respective sub-number indicates the position of the lens element consecutively from the object to image side of the lens system. The axial spacings along the optical axis are designated by the letter D and refer to both airspaces and the relative thickness of the lens. The radii of curvature is designated by the letter R. Both the axial spacings D and the radius of curvatures R are also designated with sub-numbers to indicate their relative positions from the object to image side of the lens system.

Figure 1:
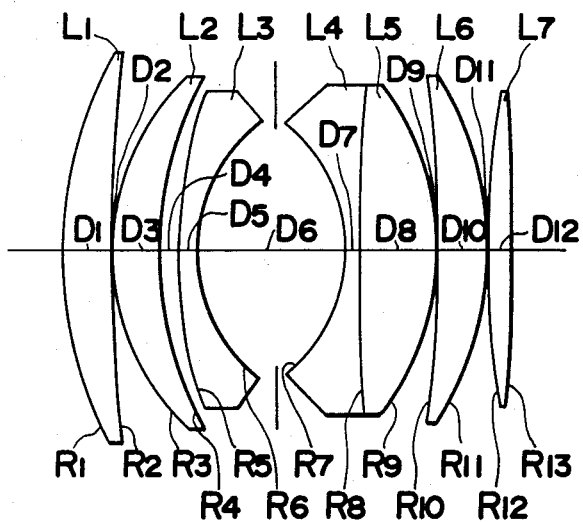
FIG. 1 is a schematic cross sectional view of a first embodiment of the present invention.
Figure 2A:
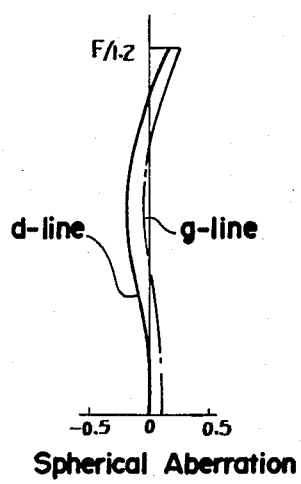
FIGS. 2a, 2b, 2c and 2d are graphical plots respectively of the spherical aberration, astigmatism, distortion and lateral spherical aberration collectively referred to as the aberrations.
Figure 2B:
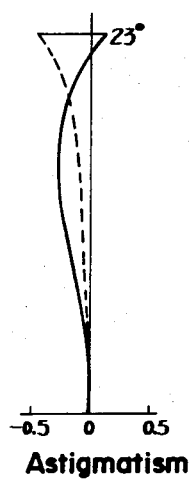
Figure 2C:
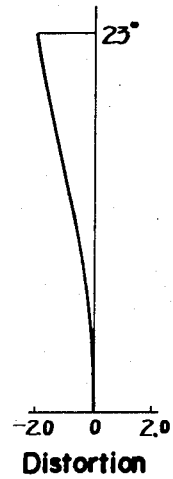
Figure 2D:
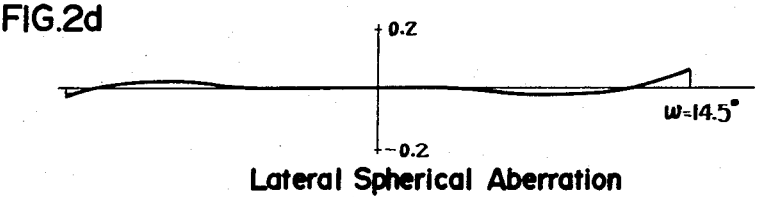
Figure 3:
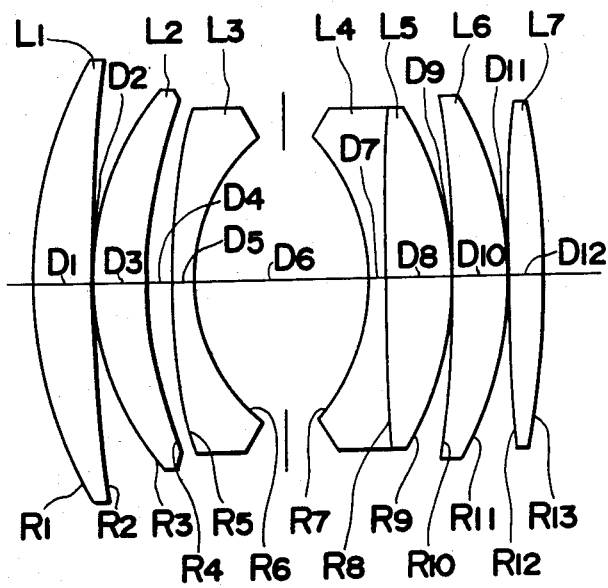
FIG. 3 is a schematic cross sectional view of a second embodiment of the present invention.
Figure 4A:
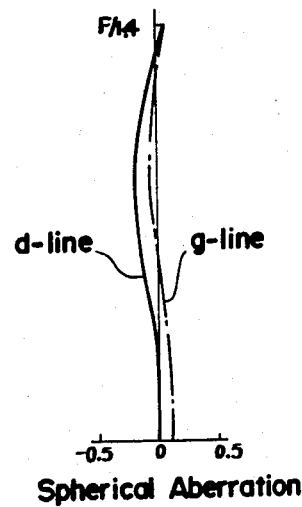
FIGS. 4a, 4b, 4c and 4d are graphical plots of the aberrations of the second embodiment.
Figure 4B:
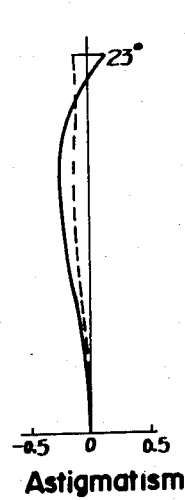
Figure 4C:
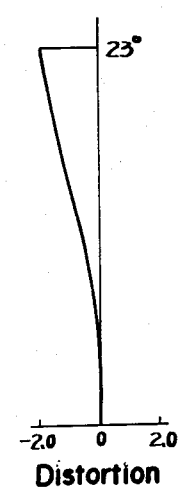
Figure 4D:
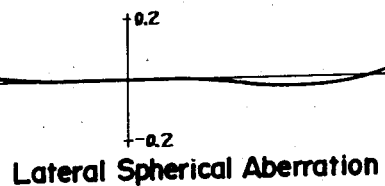
Figure 5:
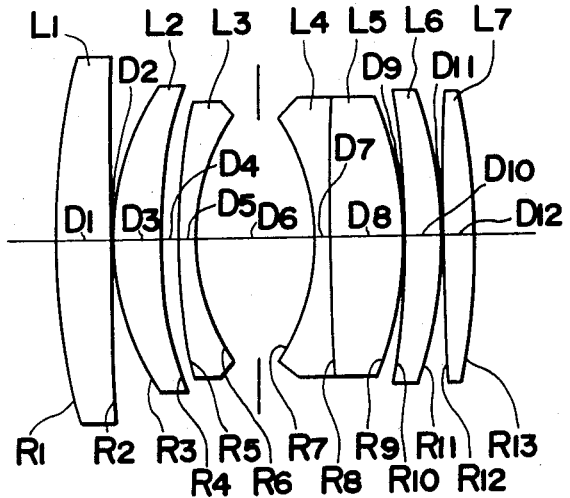
FIG. 5 is a schematic cross sectional view of the third embodiment of the present invention.
Figure 6A:
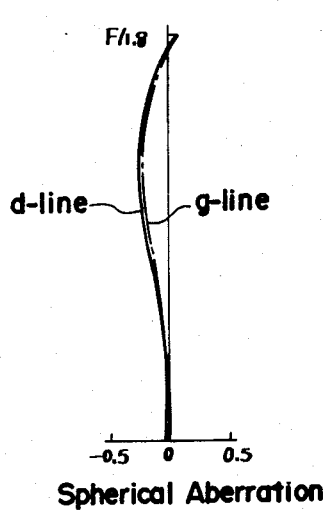
FIGS. 6a, 6b, 6c and 6d are graphical plots of the aberrations of the third embodiments.
Figure 6B:
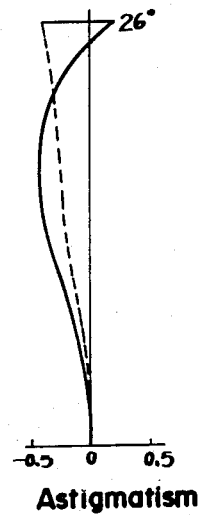
Figure 6C:
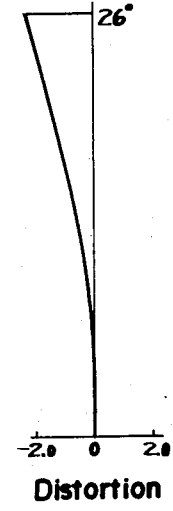
Figure 6D:
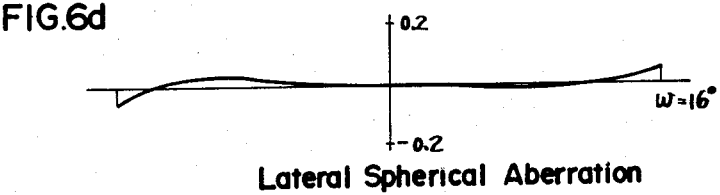

As disclosed in the schematic cross section view set forth in FIGS. 1, 3 and 5, the improved Gauss type lens system according to the present invention comprises six separate lens groups. These lens groups consist consecutively from the object to image side of a first front group consisting of a positive meniscus single lens element $L_1$ convex to the object side; a second group consisting of a positive meniscus single lens element $L_2$ convex to the object side; a third group consisting of a negative meniscus single lens element $L_3$ convex to the object side; a fourth group consisting of a meniscus shaped doublet element concave to the object side formed by cementing negative and positive sub-elements $L_4$ and $L_5$; a fifth group consisting of a positive meniscus single lens element $L_6$ concave to the object side; and a sixth rear group consisting of a positive single lens element $L_7$.

As known in the prior art, a six group, seven element modified Gauss type lens system is characterized by an airspace $D_4$ formed between the second and third lens elements $L_2$ and $L_3$. This airspace $D_4$ is provided by separating a doublet, which is the second element in the original Gauss type lens system, to provide a negative refractive power for correcting the flare relating to off-axial pencil rays. The problem of flare is inherent in the Gauss type lens system, and the provision of the airspace $D_4$ improves the lens system to permit a high contrast image even in a case of a large aperture ratio. However, the increase of the negative refractive power of the airspace $D_4$ to reduce flare has also the effect of increasing the Petzval sum, which is unfavorable to the correction of field curvature. The negative refractive power of the airspace $D_4$, accordingly, should be determined within an appropriate range for correcting both the off-axial flare and the field curvature. The above condition (1) relates to the definition of that range for the present invention. Below the lower limit of condition (1), the field curvature becomes excessive because of the increase of the Petzval sum although the off-axial flare may be reduced. Above the upper limit, it is difficult to correct the off-axial flare.

Conditions (2) through (5) relate directly to the design parameters of providing a relatively large back focal length with various aberrations well corrected. In the six group, seven element improved Gauss type lens system, a pencil of light converges through the first refractive surface $R_1$ to the sixth refractive surface $R_6$ and diverges through the successive seventh refractive surface $R_7$ to the eleventh refractive surface $R_{11}$. Accordingly, the relative values of axial distances between those refractive surfaces are important in determining the back focal distance. In particular, compliance with condition (4) relates directly to the magnitude of axial distances. Below the lower limit of condition (4), the light path $D_7+D_8+D_9+D_{10}$, wherein a pencil of light diverges, is insufficient relative to the light path $D_1+D_2+D_3+D_4+D_5$ wherein the pencil of light converges. This condition makes it difficult to obtain a desired back focal distance with various aberrations well corrected. Above the upper limit of condition (4) off-axial flare is difficult to be corrected although a long back focal length may be favorably obtained. Condition (2) defines a balance between positive and negative refractive powers with respect to positive refractive surfaces $R_1$ and $R_3$ which represent the positive refractive power in the lens group at the object side of the aperture stop and the negative refractive surface $R_6$ which represents the negative refractive power in the same lens groups at the object side of the aperture stop. In a similar manner, condition (2) defines a balance between positive and negative refractive powers in the lens groups at the image side of the aperture stop with respect to the refractive surfaces $R_7$, $R_9$, and $R_{11}$. Conditions (2) and (3) correct various aberrations while maintaining the back focal distance sufficiently great, and are particularly favorable to the correction of coma and distortion.

A proper balance of the refractive indices to correct various aberrations while maintaining a sufficiently large back focal distance are set forth in condition (5). These refractive indices are given for the lens elements $L_3$ and $L_4$ which respectively have surfaces $R_6$ and $R_7$ that provide a relatively high negative refractive power in the lens system. The relatively high refractive index material is required to permit the correction of spherical aberration and off axial flare that accompany the increase in the back focal distance. It should also be noted that by adhering to conditions (2) and (3) it is possible to insure that the total lens system will be relatively compact.

The chromatic aberrations that are generated in the lens system are corrected by conditions (6) and (7). In particular condition (6) corrects the lateral chromatic aberrations while condition (7) is provided to correct those aberrations resulting from relatively shorter wave length such as the spherical aberration with respect to the g-line. Violation of the range of condition (7) will permit the introduction of aberrations for both the axial and off axial pencil rays with respect to light rays of shorter wave lengths.

The following Tables 1 to 3 disclose the first to the third embodiments of the present invention.

Table 1

(Embodiment 1) $f = 100 \quad 1:1.2 \quad 2\omega = 46°$

| Radius of Curvature | Axial Distance | Refractive Index | Abbe Number |
|---|---|---|---|
| $R_1 = 88.05$ | | | |
| | $D_1 = 11.0$ | $N_1 = 1.7885$ | $\nu_1 = 45.7$ |
| $R_2 = 404.87$ | | | |
| | $D_2 = 0.44$ | | |
| $R_3 = 51.06$ | | | |
| | $D_3 = 10.0$ | $N_2 = 1.7856$ | $\nu_2 = 42.8$ |
| $R_4 = 80.10$ | | | |
| | $D_4 = 3.7$ | | |
| $R_5 = 99.43$ | | | |
| | $D_5 = 3.6$ | $N_3 = 1.7174$ | $\nu_3 = 29.4$ |
| $R_6 = 33.09$ | | | |
| | $D_6 = 32.13$ | | |
| $R_7 = -35.98$ | | | |
| | $D_7 = 3.5$ | $N_4 = 1.7618$ | $\nu_4 = 26.6$ |
| $R_8 = 519.44$ | | | |
| | $D_8 = 16.7$ | $N_5 = 1.7885$ | $\nu_5 = 45.7$ |
| $R_9 = -59.97$ | | | |
| | $D_9 = 0.3$ | | |
| $R_{10} = -335.50$ | | | |
| | $D_{10} = 10.4$ | $N_6 = 1.7885$ | $\nu_6 = 45.7$ |
| $R_{11} = -71.84$ | | | |
| | $D_{11} = 0.31$ | | |
| $R_{12} = 208.23$ | | | |
| | $D_{12} = 5.5$ | $N_7 = 1.7495$ | $\nu_7 = 50.1$ |
| $R_{13} = -513.55$ | | | |

Back Focal Distance $f_b' = 71.9$

Table 2

(Embodiment 2) $f = 100 \quad 1:1.4 \quad 2\omega = 46°$

| Radius of Curvature | Axial Distance | Refractive Index | Abbe Number |
|---|---|---|---|
| $R_1 = 75.00$ | | | |
| | $D_1 = 10.0$ | $N_1 = 1.7885$ | $\nu_1 = 45.7$ |
| $R_2 = 314.55$ | | | |
| | $D_2 = 0.3$ | | |
| $R_3 = 48.50$ | | | |
| | $D_3 = 8.4$ | $N_2 = 1.7650$ | $\nu_2 = 46.3$ |
| $R_4 = 76.46$ | | | |
| | $D_4 = 4.2$ | | |
| $R_5 = 105.61$ | | | |
| | $D_5 = 4.0$ | $N_3 = 1.7006$ | $\nu_3 = 30.1$ |
| $R_6 = 30.38$ | | | |
| | $D_6 = 29.3$ | | |
| $R_7 = -32.49$ | | | |
| | $D_7 = 2.8$ | $N_4 = 1.7552$ | $\nu_4 = 27.5$ |
| $R_8 = 800.0$ | | | |
| | $D_8 = 11.2$ | $N_5 = 1.7440$ | $\nu_5 = 45.0$ |
| $R_9 = -56.32$ | | | |
| | $D_9 = 0.3$ | | |
| $R_{10} = -232.68$ | | | |
| | $D_{10} = 9.1$ | $N_6 = 1.7810$ | $\nu_6 = 44.5$ |
| $R_{11} = -57.45$ | | | |
| | $D_{11} = 0.3$ | | |
| $R_{12} = 482.00$ | | | |
| | $D_{12} = 5.2$ | $N_7 = 1.7200$ | $\mu_7 = 50.2$ |
| $R_{13} = -164.25$ | | | |

Back Focal Distance $f_b' = 72.35$

Table 3

(Embodiment 3) $f = 100 \quad 1:1.8 \quad 2\omega = 52°$

| Radius of Curvature | Axial Distance | Refractive Index | Abbe Number |
|---|---|---|---|
| $R_1 = 117.07$ | | | |
| | $D_1 = 8.99$ | $N_1 = 1.7885$ | $\nu_1 = 45.7$ |
| $R_2 = 1226.07$ | | | |
| | $D_2 = 0.36$ | | |
| $R_3 = 44.18$ | | | |
| | $D_3 = 8.02$ | $N_2 = 1.8070$ | $\nu_2 = 39.8$ |
| $R_4 = 72.96$ | | | |
| | $D_4 = 3.10$ | | |
| $R_5 = 100.86$ | | | |
| | $D_5 = 2.79$ | $N_3 = 1.7174$ | $\nu_3 = 29.4$ |
| $R_6 = 34.49$ | | | |
| | $D_6 = 20.0$ | | |
| $R_7 = -36.50$ | | | |
| | $D_7 = 3.01$ | $N_4 = 1.7400$ | $\nu_4 = 28.3$ |
| $R_8 = 704.64$ | | | |
| | $D_8 = 12.01$ | $N_5 = 1.7883$ | $\nu_5 = 47.3$ |
| $R_9 = -64.77$ | | | |
| | $D_9 = 0.35$ | | |
| $R_{10} = -167.88$ | | | |
| | $D_{10} = 6.20$ | $N_6 = 1.7885$ | $\nu_6 = 45.7$ |
| $R_{11} = -69.80$ | | | |
| | $D_{11} = 0.33$ | | |
| $R_{12} = -4791.6$ | | | |
| | $D_{12} = 5.0$ | $N_7 = 1.7810$ | $\nu_7 = 44.5$ |
| $R_{13} = -112.46$ | | | |

Back Focal Distance $f_b' = 79.8$

The spherical aberration, astigmatism, distortion, and lateral spherical aberration for Table 1 is set forth respectively in FIGS. 2a, 2b, 2c and 2d. Graphical plots of these aberrations are also provided for Table 2 in FIGS. 4 and for Table 3 in FIGS. 6.

It is to be further understood that various modifications of the generic concepts of this invention are possible without departing from its spirit and accordingly the scope of the present invention should be determined solely from the following claims.

What is claimed is:

1. A modified Gauss type lens system comprising six separate lens groups consisting, consecutively from the object to the image side, of:
   a first front group consisting of a positive meniscus single lens element convex to the object side;
   a second group consisting of a positive meniscus single lens element convex to the object side;
   a third group consisting of a negative meniscus single lens element convex to the object side;
   a fourth group consisting of a meniscus shaped doublet element concave to the object side formed by cementing negative and positive sub-elements;
   a fifth group consisting of a positive meniscus single lens element concave to the object side; and
   a sixth rear group consisting of a positive single lens element, wherein the lens system fulfills the following conditions:

$$-0.4 < (\Phi_4 + \Phi_5)f < -0.24$$

$$-1.21 < (\Phi_1 + \Phi_3)/\Phi_6 < -1.12$$

$$-1.21 < (\Phi_9 + \Phi_{11})/\Phi_7 < -1.13$$

$$0.85 < (D_7 + D_8 + D_9 + D_{10})/(D_1 + D_2 + D_3 + D_4 + D_5) < 1.1$$

$$N_3 < 1.67, N_4 < 1.67$$

$$\nu_4 < \nu_3$$

$-0.1 < f/R_8 < 0.2$ wherein:

$R_i$ represents the radius of curvature of the i-th refractive surface counted from the object side;

$D_i$ represents the i-th axial distance (i.e., airspace or lens thickness) counted from the object side;

$N_i$ represents the refractive index with respect to d-line of the i-th glass material counted from the object side;

$\nu_i$ represents the Abbe number of the i-th glass material counted from the object side;

$\Phi_i$ represents the refractive power of the i-th refractive surface counted from the object side, the refractive power $\Phi_i$ being defined by the radius of curvature $R_i$ of the i-th refractive surface, the refractive index n of the medium on the object side of the i-th refractive surface and the refractive index n' of the medium on the image side of the i-th refractive surface as follows:

$\Phi_i = (n' - n)/R_i$, and f represents the focal length of the whole lens system.

2. An improved Gauss type lens system comprising the following design parameters:

| Radius of Curvature | f = 100   1 : 1.2   2ω = 46° | | |
|---|---|---|---|
| | Axial Distance | Refractive Index | Abbe Number |
| $R_1 = 88.05$ | | | |
| | $D_1 = 11.0$ | $N_1 = 1.7885$ | $\nu_1 = 45.7$ |
| $R_2 = 404.87$ | | | |
| | $D_2 = 0.44$ | | |
| $R_3 = 51.06$ | | | |
| | $D_3 = 10.0$ | $N_2 = 1.7856$ | $\nu_2 = 42.8$ |
| $R_4 = 80.10$ | | | |
| | $D_4 = 3.7$ | | |
| $R_5 = 99.43$ | | | |
| | $D_5 = 3.6$ | $N_3 = 1.7174$ | $\nu_3 = 29.4$ |
| $R_6 = 33.09$ | | | |
| | $D_6 = 32.13$ | | |
| $R_7 = -35.98$ | | | |
| | $D_7 = 3.5$ | $N_4$ 32 1.7618 | $\nu_4 = 26.6$ |
| $R_8 = 519.44$ | | | |
| | $D_8 = 16.7$ | $N_5 = 1.7885$ | $\nu_5 = 45.7$ |
| $R_9 = -59.97$ | | | |
| | $D_9 = 0.3$ | | |
| $R_{10} = -335.50$ | | | |
| | $D_{10} = 10.4$ | $N_6 = 1.7885$ | $\nu_6 = 45.7$ |
| $R_{11} = -71.84$ | | | |
| | $D_{11} = 0.31$ | | |
| $R_{12} = 208.23$ | | | |
| | $D_{12} = 5.5$ | $N_7 = 1.7495$ | $\nu_7 = 50.1$ |
| $R_{13} = -513.55$ | | | | where the Back Focal Distance $f_b' = 71.9$

3. An improved Gauss type lens system comprising the following design parameters:

| Radius of Curvature | f = 100   1 : 1.4   2ω = 46° | | |
|---|---|---|---|
| | Axial Distance | Refractive Index | Abbe Number |
| $R_1 = 75.00$ | | | |
| | $D_1 = 10.0$ | $N_1 = 1.7885$ | $\nu_1 = 45.7$ |
| $R_2 = 314.55$ | | | |
| | $D_2 = 0.3$ | | |
| $R_3 = 48.50$ | | | |
| | $D_3 = 8.4$ | $N_2 = 1.7650$ | $\nu_2 = 46.3$ |
| $R_4 = 76.46$ | | | |
| | $D_4 = 4.2$ | | |
| $R_5 = 105.61$ | | | |
| | $D_5 = 4.0$ | $N_3 = 1.7006$ | $\nu_3 = 30.1$ |
| $R_6 = 30.38$ | | | |
| | $D_6 = 29.3$ | | |
| $R_7 = -32.49$ | | | |
| | $D_7 = 2.8$ | $N_4 = 1.7552$ | $\nu_4 = 27.5$ |
| $R_8 = 800.0$ | | | |
| | $D_8 = 11.2$ | $N_5 = 1.7440$ | $\nu_5 = 45.0$ |
| $R_9 = -56.32$ | | | |
| | $D_9 = 0.3$ | | |
| $R_{10} = -232.68$ | | | |
| | $D_{10} = 9.1$ | $N_6 = 1.7810$ | $\nu_6 = 44.5$ |
| $R_{11} = -57.45$ | | | |
| | $D_{11} = 0.3$ | | |
| $R_{12} = 482.00$ | | | |
| | $D_{12} = 5.2$ | $N_7 = 1.7200$ | $\nu_7 = 50.2$ |
| $R_{13} = -164.25$ | | | | where the Back Focal Distance $f_b' = 72.35$

4. An improved Gauss type lens system comprising the following design parameters:

| Radius of Curvature | f = 100   1 : 1.8   2ω = 52° | | |
|---|---|---|---|
| | Axial Distance | Refractive Index | Abbe Number |
| $R_1 = 117.07$ | | | |
| | $D_1 = 8.99$ | $N_1 = 1.7885$ | $\nu_1 = 45.7$ |
| $R_2 = 1226.07$ | | | |
| | $D_2 = 0.36$ | | |
| $R_3 = 44.18$ | | | |
| | $D_3 = 8.02$ | $N_2 = 1.8070$ | $\nu_2 = 39.8$ |
| $R_4 = 72.96$ | | | |
| | $D_4 = 3.10$ | | |
| $R_5 = 100.86$ | | | |
| | $D_5 = 2.79$ | $N_3 = 1.7174$ | $\nu_3 = 29.4$ |
| $R_6 = 34.49$ | | | |
| | $D_6 = 20.0$ | | |
| $R_7 = -36.50$ | | | |
| | $D_7 = 3.01$ | $N_4 = 1.7400$ | $\nu_4 = 28.3$ |
| $R_8 = 704.64$ | | | |
| | $D_8 = 12.01$ | $N_5 = 1.7883$ | $\nu_5 = 47.3$ |
| $R_9 = -64.77$ | | | |
| | $D_9 = 0.35$ | | |
| $R_{10} = -167.88$ | | | |
| | $D_{10} = 6.20$ | $N_6 = 1.7885$ | $\nu_6 = 45.7$ |
| $R_{11} = -69.80$ | | | |
| | $D_{11} = 0.33$ | | |
| $R_{12} = -4791.6$ | | | |
| | $D_{12} = 5.0$ | $N_7 = 1.7810$ | $\nu_7 = 44.5$ |
| $R_{13} = -112.46$ | | | | where the Back Focal Distance $f_b' = 79.8$

* * * * *

UNITED STATES PATENT AND TRADEMARK OFFICE
CERTIFICATE OF CORRECTION

PATENT NO. : 4,182,550
DATED : January 8, 1980
INVENTOR(S) : Tamikazu Yamaguchi

It is certified that error appears in the above—identified patent and that said Letters Patent is hereby corrected as shown below:

Column 2, line 39, delete "$N_3 < 1.67$, $N_4 < 1.67$" and insert --$N_3 > 1.67$, $N_4 > 1.67$--.

Column 6, line 66, delete "$N_3 < 1.67$, $N_4 < 1.67$" and insert --$N_3 > 1.67$, $N_4 > 1.67$--.

Signed and Sealed this

Fifteenth Day of July 1980

[SEAL]

Attest:

SIDNEY A. DIAMOND

Attesting Officer

Commissioner of Patents and Trademarks